United States Patent [19]

Grove

[11] 3,709,055

[45] Jan. 9, 1973

[54] GEAR TOOTH PROFILE

[76] Inventor: Leslie H. Grove, 707 East Hoyt Ave., Saint Paul, Minn. 55106

[22] Filed: Jan. 4, 1971

[21] Appl. No.: 103,617

[52] U.S. Cl. .................................74/462, 418/206
[51] Int. Cl. .............................F16h 55/06, F01c 1/18
[58] Field of Search ........74/462, 460, 413; 418/206, 418/171

[56] References Cited

UNITED STATES PATENTS

| | | | |
|---|---|---|---|
| 3,364,819 | 1/1968 | Ackley | 74/462 X |
| 2,960,884 | 11/1960 | Hill | 74/462 |
| 2,064,699 | 12/1936 | Stahl et al | 74/462 X |

FOREIGN PATENTS OR APPLICATIONS 1,322,984  2/1963  France ..................74/462

*Primary Examiner*—Leonard H. Gerin
*Attorney*—David A. Roden

[57] ABSTRACT

Gear tooth profiles having circular tip arcs and circular dedendum arcs with straight line flanks and a method for designing gears having such teeth which method involves laying out an isosceles triangle and drawing circular tip and dedendum arcs relative to the base side and base corners of the triangle, the arcs having radii no greater than one-fourth the length of the base.

6 Claims, 6 Drawing Figures

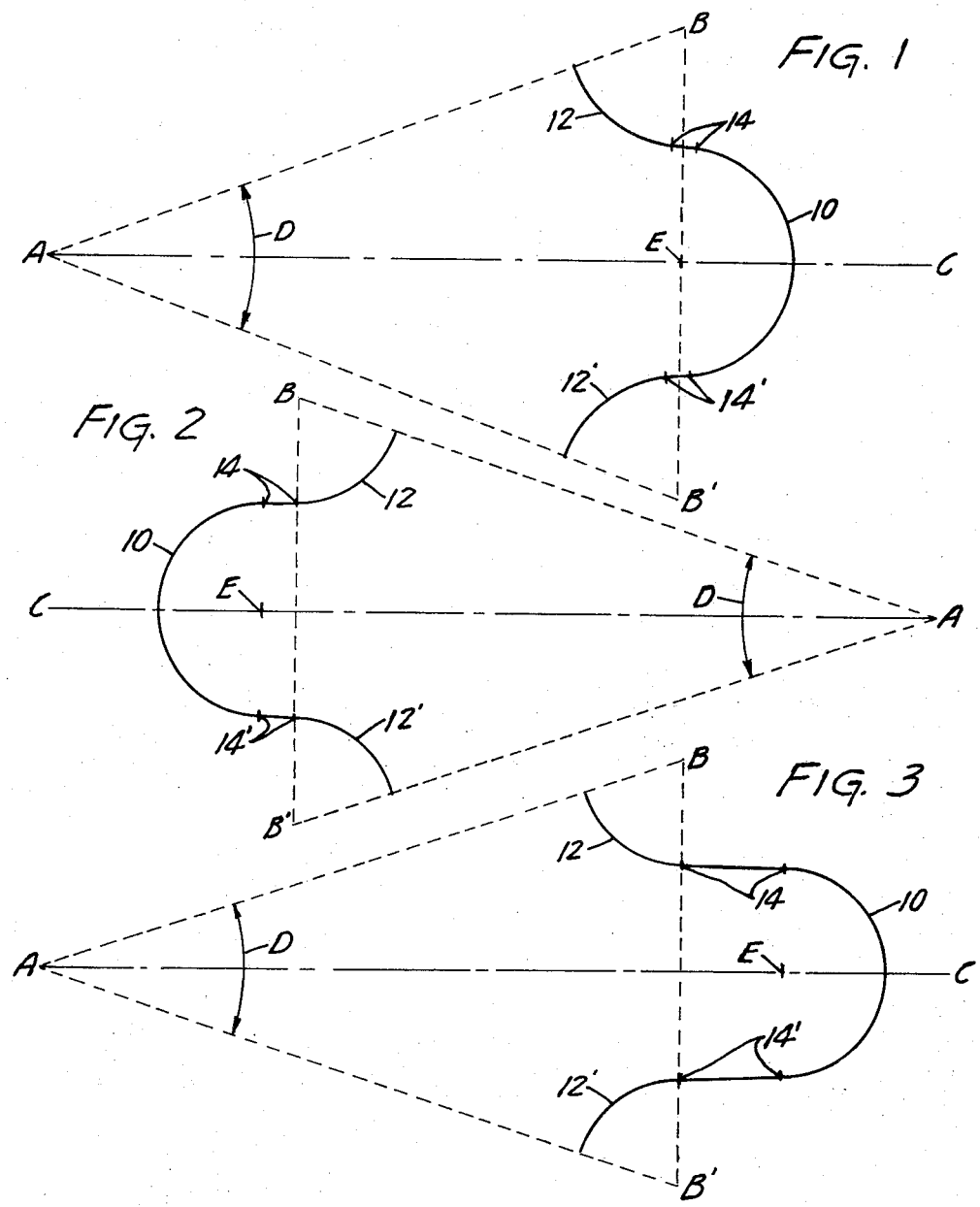

INVENTOR.
LESLIE H. GROVE
BY
David A Roden
ATTORNEY

GEAR TOOTH PROFILE

This invention relates to tooth profiles for gears and gearing, and in particular to gear teeth with a novel shape which provides increased strength, and gears which may be advantageously used as displacement elements in fluid pressure devices. The invention also relates to a novel method for designing tooth profiles according to the invention.

Accordingly, it is an aim of the present invention to provide gear teeth of greatly improved strength as compared to involute teeth and as compared to many of the known tooth designs which have as one of their purposes increased strength as compared to involute teeth.

A further aim of the invention is to provide tooth profiles which, when used on circular gears, provide increased displacement as compared to conventional gears of the same overall dimensions but having involute teeth.

The present invention provides a tooth profile for gearing in which the tooth tip follows no more than 180° of the true arc of a circle, with the center point of said tip arc on a radial line bisecting the tooth, the dedendum arcs both follow identical circular arcs, with the radii of the dedendum arcs being greater than the radius of the tip arc, and the adjacent ends of the dedendum arcs and the tip arc blending with and being joined by a straight line to form the flanks of the tooth, the radial extensions of said straight lines forming acute angles with an extension of said radial line at a point radially beyond said tip.

The present invention also provides a method of designing a gear tooth comprising the steps of (1) laying out an isosceles triangle having an apex angle equal to 360°/n where n is a whole number greater than two, (2) establishing a centerline bisecting the apex angle, (3) drawing a circular tip arc of not more than 180° which tip arc has its center on or outside the base of said triangle and on said centerline, the said tip radius being less than one-fourth the length of said base, (4) drawing circular dedendum arcs within said triangle, said dedendum arcs having radii no greater than one-fourth the length of said base and having their respective center points at the non-apical corners of said triangle, and (5) drawing straight lines connecting the tip arc with the adjacent dedendum arc to form the flanks of said tooth, the radii of the tip arc and dedendum arcs being so selected that said flank lines intersect said centerline at a point outside said triangle and form an acute angle therewith.

Many patents have issued relating to gearing and tooth profiles in which the tip of the tooth is a circular arc as in the present invention but the flanks of the teeth are generated by or derived from an elliptic arc. Garnett, U.S. Pat. No. 1,833,159 shows teeth in which both the tooth tip and the dedendum or "notch" between the teeth are half circles, the width of the notch being equal to the width of the tooth tip, and in certain instances the tooth flank being formed by parallel straight lines.

Tooth profiles according to the present invention may be used to form circular or spur gears which run on parallel or intersecting axes, used to form beveled or helical gears, mating internally and externally toothed gears, and to form racks to mesh with pinion gears. The tooth profiles may also be used in making spiral and worm gears.

An advantage of the present invention is the fact that an easy method is provided for designing tooth profiles, the method comprising drawing an isosceles triangle, laying out three circular arc segments and connecting arc segments with straight lines for each tooth flank whereby a first gear having any number of teeth is easily designed, and a meshing second gear of any desired number of teeth "n" may also be easily designed by drawing a further isosceles triangle in which the apex angle equals 360°/n the base has the same length as the base of the triangle used in designing the teeth of the first gear, and using identical arc radii as in the first gear, the arc centers of the second gear tooth design having the same relative location to the parts of the second triangle as was used in laying out the tooth design for the teeth of the first gear.

The invention will be further described and may be more readily understood by reference to the written description in conjunction with the following drawings in which:

FIGS. 1, 2 and 3 illustrate a method of designing gear tooth profiles according to the invention;

Figure 4:
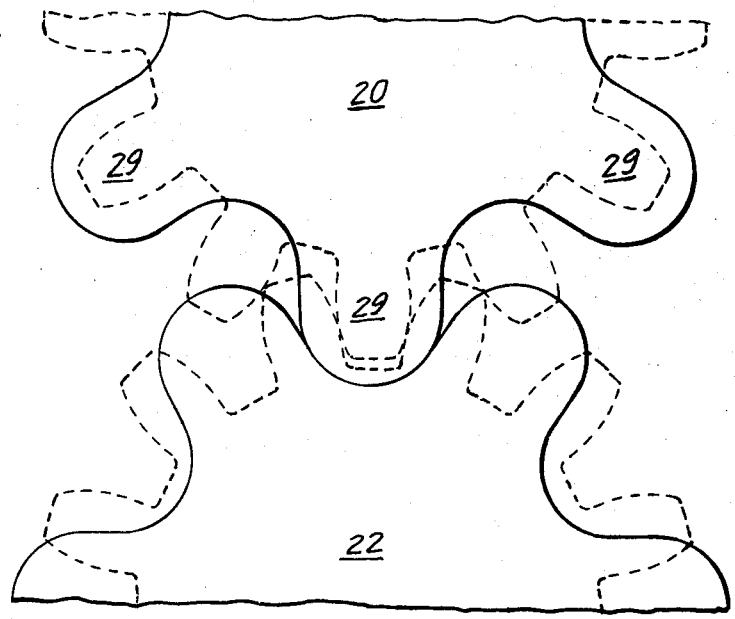
FIG. 4 is a side view, partially broken away, of a pair of gears according to the present invention in mesh and superimposed over a corresponding portion (shown in dotted lines) of a pair of gears with involute teeth which have the same center locations as the gears of the present invention.

Referring now to FIGS. 1, 2 and 3, one way of laying out a gear with tooth profiles according to the invention is illustrated therein, in conjunction with the following description:

Starting at point A, lay out an isosceles triangle ABB', with side A-B = A-B' and the angle $D$ (sometimes referred to herein as the apex angle) equal to 360°/n, where n is the number of teeth desired on the gear. Draw centerline A-C, which bisects angle $D$ and intersects base line B-B'.

Generally, n is preferably at least five, and will usually be selected to be eight or more to provide smoother running gears with less noise at high speeds, etc., some of these factors also depend upon the gear material, e.g., steel vs. an elastomeric material.

The tooth tip 10 is drawn by selecting a radius which is no greater in length than one-fourth the length of line B-B' minus 0.0015 inch, and using such radius, establishing a center point E on line A-C so that the tip of the arc thereof is outside the triangle ABB' at the point where the arc crosses line A-C.

This tip arc is drawn, and does not exceed 180°. Next, identical dedendum arcs 12, 12' are drawn which have their centers at the base line corners, i.e., at points B and B' respectively. These radii are equal, and no greater than one-fourth the length of base line B-B'.

For best results, the tip and dedendum arc radii are held to the maximum lengths, i.e., the dendendum arc radii is one-fourth of B-B' and the tip arc radius is about 0.0015 inch shorter. Also, for best results, the center of the tip radius should not be located inside the triangle ABB'. In FIG. 1, the center is located on line B-B, and in FIGS. 2 and 3 the center point E is progressively further outside the triangle thereby forming a longer tooth.

Each flank 14, 14' of the tooth is formed by drawing a straight line which connects or smoothly joins the tip arc and the adjacent dedendum arc without intersecting either arc. It should be noted that in designing a tooth according to the invention a radial extension of the flank — i.e., of line 14, or 14' in each instance must form an acute angle with the line A-C at the point where the respective lines intersect.

As used herein, the tip of the tooth is that portion of the tip arc starting from and beyond the point where it blends with lines 14 and 14', and the tooth dedendum is that part of each tooth which lies within the triangle ABB', from the point where the flank line blends with the dedendum arc on each side of the tooth. Thus, the full dedendum arc between two adjacent teeth will be formed from two adjacent dedendum arcs and will always be less than 180°. The tip arc always lies outside the triangle ABB' and never will exceed 180°.

For the most efficient gearing, all mating gears must have teeth of the same length and the same beam thickness (i.e., the thickness of the tooth at the line B-B'). Therefore, to design mating gears, the length of the side B-B' of the first and mating gear design triangles must be of equal length even though the apex angle will vary depending on the number of teeth desired on the mating gear. Also, all the dedendum radii must be equal and the tip arc radii must be equal. Furthermore, the tip arc center E on line A-C in each design triangle must be located in the same relative position with respect to its distance from point A when designing mating gears, i.e., the ratio of the length A-B:A-E of one gear must be same as the ratio of the lengths A-B:A-E for any mating gear.

Referring now to FIG. 4, portions of mating gears 20 and 22 having tooth profiles according to the present invention, are shown in mesh. Also shown in broken lines in FIG. 4 are portions of mating gears with involute teeth. The gear centers for both sets of mating gears are identical.

As can be seen from FIG. 4, a tooth 29 according to the present invention is approximately twice as thick as an involute tooth for meshing gears with the same center locations and thus the present invention provides a much stronger tooth. Therefore, one advantage of the present invention is that materials of less tensile strength may be used to produce gears which gears can transmit equal or greater horsepower than gears of a stronger material which occupy substantially the same space. Furthermore, one can employ gears according to this invention which are made of materials such as of polyurethanes, synthetic rubbers and other elastomers, or epoxy resins or other cured resins, whereas involute gears of corresponding size would lack the necessary tensile strength to be employed in the same available space in a given machine, pump or the like. In other words, materials can be used which are obviously desirable to employ because of properties such as their resistance to corrosion by water, acids or alkalis, etc., which materials are not used in prior art gears of the same size because the prior art gears lacked the requisite tooth strength for a given use.

Figure 5:
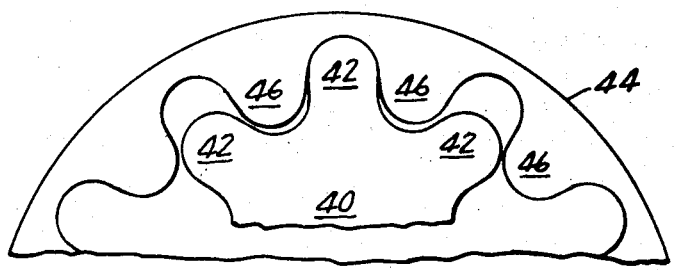
FIG. 5 is a side view, partially broken away, of a spur gear in mesh with a ring gear, both gears having teeth according to the instant invention.

FIG. 5 shows a section of a portion of an inner gear 40, having teeth 42 in mesh with ring gear 44 having teeth 46. The teeth 42 and 46 on the inner and ring gear respectively have identical tip radii and dedendum radii, and the distances between the tip radii centers of the ring gear will be identical to the dedendum radii centers of the inner gear. The ring gear is designed in the same manner as the meshing inner gear, except that the radius of the tip arc and the radius of the dedendum arc are reversed.

Figure 6:
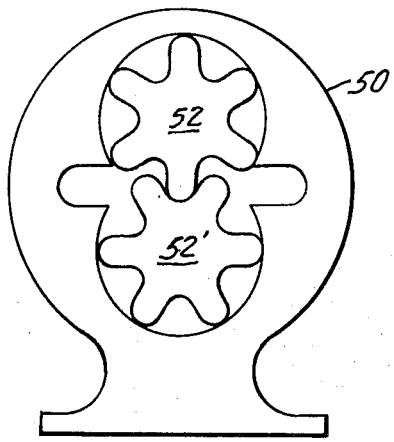
FIG. 6 is a cross-sectional view of an otherwise conventional gear pump utilizing a pair of gears according to the invention.

FIG. 6 shows a convention type gear pump 50 utilizing meashing gears 52 and 52', according to the invention. The gears 52, 52' have been designed along the principles illustrated in FIG. 3, and have increased tooth length as compared to those designed according to FIGS. 1 or 2 where the center point of the tip radius is on or closer to the line B-B'. This feature of longer tooth length is a particularly desirable feature when such gears are used as displacement elements in fluid devices, such as fluid pumps and motors. Longer teeth provide a greater volumetric displacement per revolution although tooth strength is decreased. However, as noted above, compared to involute teeth, gear teeth according to this invention have both greater volumetric displacement and increased tooth strength as compared to involute gears with the same outside diameter. Generally, the increase in volumetric displacement over an equal diameter involute gear amounts to approximately 33 percent for small diameter gears, about 7 times greater for, e.g., a 4 inch gear, and even greater for still larger diameter gears.

While the gears illustrated in FIGS. 4, 5 and 6 are illustrated as being cut on a plane perpendicular to the axis thereof, such gears can also be produced with a helix angle, thus gaining more strength and conserving space. Similarly bevel, miter and worm gears can be produced using the novel tooth profiles of this invention.

I claim:

1. A tooth profile for gearing in which the tooth tip follows no more than 180° of the true arc of a circle, with the center point of said tip arc on a radial line bisecting the tooth, the dedendum arcs both follow identical circular arcs, with the radii of the dedendum arcs being greater than the radius of the tip arc, and the adjacent ends of the dedendum arcs and the tip arc blending with and being joined by a straight line to form the flanks of the tooth, the radial extensions of said straight lines forming acute angles with an extension of said radial line at a point radially beyond said tip.

2. A tooth profile according to claim 1 in which the tooth profile has the following relationship to an isosceles triangle in which the apex angle equals 360°/$n$ where $n$ is a whole number greater than two:
   a. the tooth tip radius center point is on a line bisecting the apex angle of said triangle, said radius being no greater than one-fourth of the length of the base of said triangle
   b. the dedendum arcs have their center points at the base angles of said triangle.

3. A tooth profile according to claim 2 in which said tooth tip radius is at least 0.0015 inch less than one-fourth the length of the base of said triangle.

4. A tooth profile according to claim 3 in which $n$ is at least eight and the center point of said tooth tip radius is on the base line of said triangle.

5. A tooth profile according to claim 3 in which $n$ is at least eight and the center point of said tooth tip radius is outside the said triangle.

6. A method of designing a gear tooth according to claim 1 comprising the steps of (1) laying out an isosceles triangle having an apex angle equal to $360°/n$ where $n$ is a whole number greater than two, (2) establishing a centerline bisecting the apex angle, (3) drawing a circular tip arc of not more than 180° which tip arc has its center on or outside the base of said triangle and on said centerline, the said tip radius being less than one-fourth the length of said base, (4) drawing circular dedendum arcs within said triangle, said dedendum arcs having radii no greater than one-fourth the length of said base and having their respective center points at the base corners of said triangle, and (5) drawing straight lines connecting the tip arc with the adjacent dedendum arc to form the flanks of said tooth, the radii of the tip arc and dedendum arcs being so selected that said flank lines intersect said centerline at a point outside said triangle and form an acute angle therewith.

* * * * *